United States Patent Office 3,165,635
Patented Jan. 12, 1965

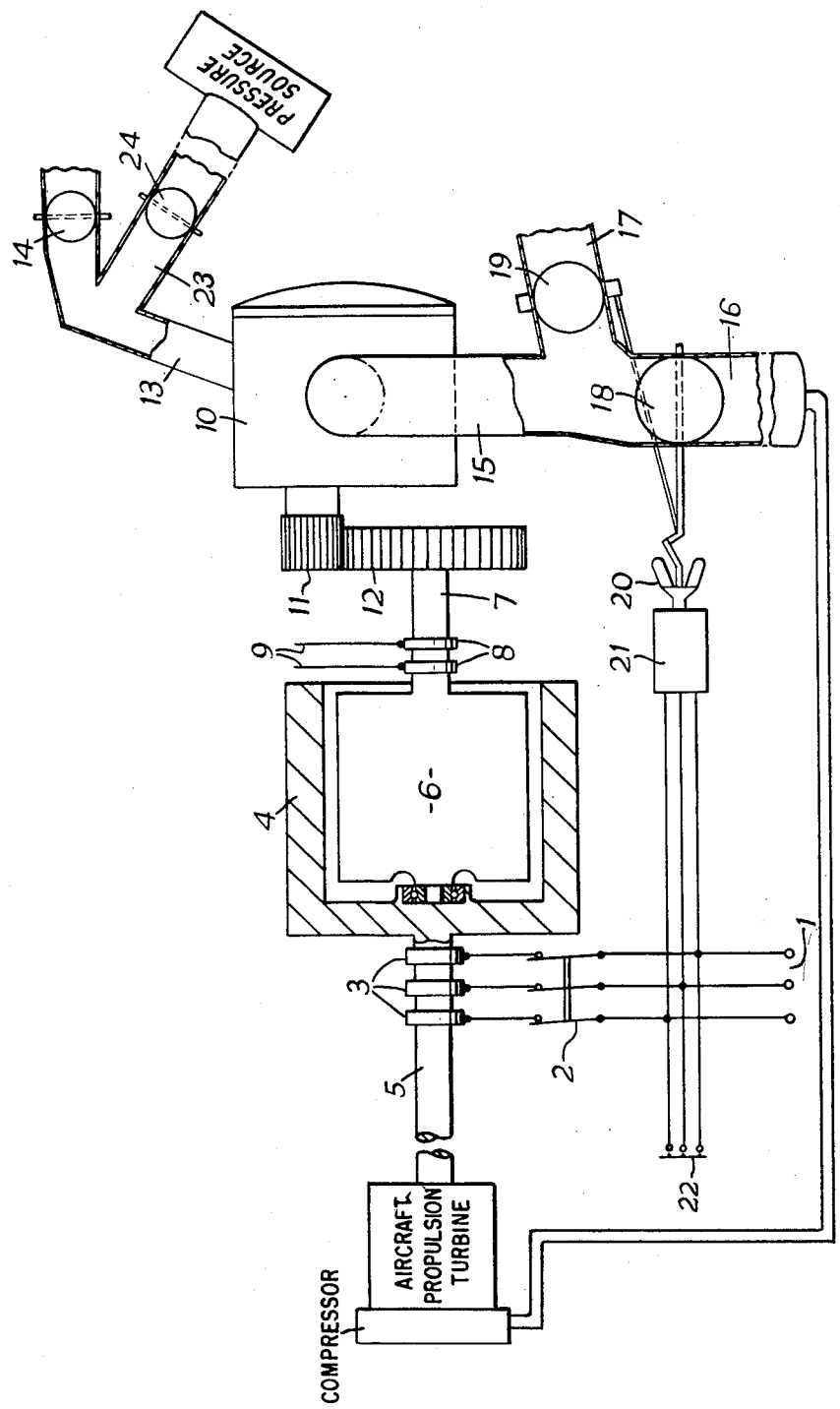

3,165,635
ELECTRICITY GENERATION PLANT
Norman Moss, London, and Peter Stanwell, Wanstead, England, assignors to The Plessey Company Limited, Ilford, England, a British company
Filed Oct. 16, 1961, Ser. No. 145,516
Claims priority, application Great Britain, Oct. 25, 1960, 36,575/60
9 Claims. (Cl. 290—5)

This invention relates to electrical generating plant of the kind in which mechanical energy for driving an electrical generator is to be mainly derived from an engine or turbine (hereinafter jointly referred-to as engine) the speed of which in normal operation varies to an appreciable extent about a normal speed, while the frequency of the current produced by the generator is to be kept substantially constant. Such conditions exist for example in A.C. generators for aircraft.

In the specification of our co-pending U.S.A. application Serial No. 38,671 filed June 24, 1960 by Moss and Stanwell we have described and claimed a constant-speed drive wherein an element to be driven at a constant speed, hereinafter called constant-speed element, is coupled by a differential gear to an engine subject to speed variations and to a positive-displacement fluid-pressure motor, automatic control means being provided operative at low engine speeds to power-drive the fluid-pressure motor in one direction at such speed as to supplement the engine-derived speed of the element to a predetermined constant-speed, and operative at higher engine speed to allow the fluid-pressure motor to be driven by reaction from the gear and to so control the speed of said motor by regulating the flow of fluid derived from said motor acting as a pump as to reduce the speed of the element below the engine-derived speed to the said predetermined constant speed, means being provided for selectively so altering the operation of the differential gear as to permit utilization of the fluid-pressure motor to start the engine.

The present invention provides electrical generating plant of the kind above specified which comprises an electric generator having an inductor member and exciter member each of which is rotatable independently of the other about a common axis, one of said members being coupled for rotation with the engine, and an auxiliary motor, preferably a rotary-displacement fluid-pressure motor, coupled to the other member of the generator, and control means responsive to variations in engine speed from a predetermined speed, or to variations in the relative rotor to stator speed of the generator, so as to cause the auxiliary motor to be power-driven to supplement the engine derived exciter-to-inductor speed if the engine-derived exciter-to-inductor speed is less than the predetermined value and to allow the auxiliary motor to be driven by the torque transmitted through the generator field so as to reduce the exciter-to-inductor speed of the generator below the engine-derived speed to the said predetermined speed when the engine-derived exciter-to-inductor speed is higher than said predetermined speed.

According to a preferred feature of the invention the apparatus according to the present invention may be also utilised for starting the engine or for ground running if means are provided for transmission of the driving power from the member of the generator which is connected to the auxiliary motor, to the member of the generator which is connected to the engine. These coupling means may be electrical in which case they may comprise means for short-circuiting or substantially short-circuiting the output terminals of the generator, or alternatively mechanical means such as a friction clutch or a dog clutch may be provided for coupling the exciter member to the inductor member of the generator.

When the auxiliary motor is an air motor, it may be controlled by valve means similar to those described in the said co-pending application.

The speed-responsive means are preferably responsive to the exciter-to-inductor speed of the generator, and preferably comprise a governor which is driven by a synchronous motor fed by the A.C. output of the generator.

The drawing accompanying the specification schematically illustrates a preferred embodiment of the invention. An A.C. system of an aircraft is supplied at terminal 1 with three phase A.C. of 400 cycles per second via a three-pole switch 2 and slip rings 3 by three-phase windings in an inductor 4 which is mounted on an engine-driven shaft 5 which may be the engine shaft of the aircraft propulsion engine or may be coupled by any suitable means to the shaft of the said engine. A rotary magnetic field, by which A.C. is induced in the windings of the inductor 4, is produced in an exciter 6 arranged inside the inductor 4 and mounted on a shaft 7 which is aligned with the shaft 5, and which carries a pair of slip rings 8 through which the exciter is fed with direct current from a line 9. The connection between the shaft 5 and the engine is such, if necessary including reduction gearing, that when the engine runs at a predetermined speed, hereinafter referred-to as cruising speed, the inductor 4 will generate A.C. of the desired frequency of 400 cycles per second when the exciter 6 is stationary. In order to enable the frequency of 400 cycles to be maintained when the engine operates above or below cruising speed, at least within a predetermined range of speeds, the rotor shaft of a rotary-displacement air motor, for example of a Roots motor 10, is coupled to the exciter shaft 7 by reduction gearing 11, 12. One side of the air motor is connected to atmosphere through a line 13 containing a shut-off valve 14, and the line 15 at the other isde of the air motor has two branches 16 and 17 each containing a control valve 18 or 19, the branch 16 being connected to a fluid-pressure supply, for example to a bleed of the engine compressor, while branch 17 is an atmospheric outlet. The valves 18 and 19 are controlled by a governor 20 operated by a three-phase synchronous motor 21 fed from the output of the inductor 4, subject to control by switch 2, so that when switch 2 is closed, the speed of the motor 21 is proportional to the output frequency of the generator, the arrangement being such that when the engine runs at cruising speed, both valves 18 and 19 are closed, so that the air motor is substantially stationary, while if the speed of motor 21 tends to drop, valve 18 opens, causing the air motor 10 to rotate the exciter 6 in a direction opposite to the rotation imparted to the inductor 4 by the engine-driven shaft 5 and thus to supplement the engine-derived frequency to restore the desired frequency of 400; in the converse case valve 18 remains shut but valve 19 will open to allow the exciter 6 to be driven by the inductor 4 through the magnetic coupling effect of the exciter field, the opening of valve 19 being so adjusted that the decrease in generator output frequency due to such rotation of the exciter 6 compensates for the increase in the engine-derived frequency which would be produced if the exciter 6 were stationary. Means may be provided, similarly as in the said co-pending specification, for producing an ejector effect in branch 17 to allow the windage resistance to such movement of the air motor to be further reduced and thus to allow compensation of even higher overspeed of the engine.

Furthermore means may be provided, similarly as in the said constant speed drive specification, for utilising the air motor to start the engine. Such means may comprise a short circuiting device 22 which will cause the generator 4, 6 to act as an eddy-current starting clutch, or mechanical means may be provided for coupling the shafts 7 and 5 to each other. In order to obtain rotation of the engine in the correct direction, it is necessary for the air motor to be driven during the starting operation in a direction opposite to that in which it is driven when it supplements the engine-derived frequency of the alternator output. For this purpose the line 13 is provided with a branch 23 leading to a suitable supply of fluid pressure available when the engine is stationary. The branch 23 contains a cut-off valve 24 and arrangements, which may be similar to those provided in the case of the said co-pending application, are made for closing valve 14 and opening valves 24 and 19 when the air motor 10 is to be used for driving the engine for starting and similar purposes.

The apparatus described may be modified without exceeding the scope of the invention. Thus the exciter may be driven by the engine and the inductor by the air-motor; furthermore the exciter may if desired be arranged to encircle the inductor.

What we claim is:

1. Electrical generating plant which comprises the combination of an engine subject to speed variations, an electrical generator having an inductor member and an exciter member each of which is rotatable independently of the other about a common axis, one of said members being coupled for rotation with the engine, an auxiliary motor coupled to the other member of the generator, and automatic control means for the auxiliary motor, fed by the generator and responsive to variations in the inductor-to-exciter-speed of the generator, and operative so as to cause the auxiliary motor to be power-driven in one direction to supplement the engine derived exciter-to-inductor speed when the engine derived exciter-to-inductor speed is less than a predetermined value and to allow the auxiliary motor to be driven in the opposite direction by the torque transmitted through the generator field so as to reduce the exciter-to-inductor speed of the generator below the engine-derived speed to the said predetermined speed when the engine-derived exciter-to-inductor speed is higher than said predetermined speed.

2. Electrical generating plant which comprises in combination an engine subject to speed variations, an electrical generator having an inductor member and an exciter member each of which is rotatable independently of the other about a common axis, one of said members being coupled for rotation with the engine, a rotary-displacement fluid-pressure motor coupled to the other member of the generator, and automatic control means for the fluid-pressure motor operative to cause the fluid-pressure motor to be power-driven in one direction to supplement the engine-derived exciter-to-inductor speed when the engine-derived exciter-to-inductor speed is less than a predetermined value and to allow the fluid-pressure motor to be driven in the opposite direction by the torque transmitted through the generator field so as to reduce the exciter-to-inductor speed of the generator below the engine-derived speed to substantially the said predetermined value when the engine-derived exciter-to-inductor speed is higher than said predetermined value.

3. Apparatus as claimed in claim 2, wherein means are provided for transmission of the driving power from the member of the generator which is connected to the auxiliary motor, to the member of the generator which is connected to the engine.

4. Apparatus as claimed in claim 3, wherein the coupling means are electrical and include means for short-circuiting or substantially short-circuiting the output terminals of the generator.

5. Apparatus as claimed in claim 3, wherein mechanical means are provided for coupling the exciter member to the inductor member of the generator.

6. Apparatus as claimed in claim 1, wherein the speed-responsive means are responsive to the exciter-to-inductor speed of the generator.

7. Apparatus as claimed in claim 1, wherein the speed-responsive means include a governor which is driven by a synchronous motor fed by the A.C. output of the generator.

8. In variable-speed propulsion plant, a prime mover operable at varying speed from a minimum speed through a cruising speed to a maximum speed, an electrical generator having an inductor member and exciter member each of which is rotatable independently of the other about a common axis, one of said members being coupled for rotation with the engine, an auxiliary motor coupled to the other member of the generator, and automatic control means for the auxiliary motor operative when the engine speed is below said cruising speed to cause the auxiliary motor to be power-driven in one direction to supplement the engine-derived exciter-to-inductor speed and operative when the engine speed is above the said cruising speed to allow the auxiliary motor to be driven in the opposite direction by the torque transmitted through the generator field at such a rate as to reduce the exciter-to-inductor speed of the generator below the engine-derived speed in such manner as to maintain the exciter-to-inductor speed of the generator substantially constant irrespective of variations of the engine speed.

9. In aircraft propulsion power plant including a gas turbine having a compressor for the intake air driven by said turbine, the combination with said turbine of an electrical generator having an inductor member and an exciter member each of which is rotatable independently of the other about a common axis, one of said members being coupled for rotation with the turbine, a rotary-displacement fluid-pressure motor coupled to the other member of the generator, and automatic control means for the rotary-displacement fluid-pressure motor responsive to variations in the exciter-to-inductor speed of the generator to admit fluid pressure from said compressor to said rotary-displacement fluid-pressure motor to cause said motor to be power-driven in one direction to supplement the engine-derived exciter-to-inductor speed to substantially a predetermined value when the turbine speed is below a given value, and to allow the rotary-displacement fluid-pressure motor to be driven in the opposite direction by the torque transmitted through the generator field so as to reduce the exciter-to-inductor speed of the generator below the turbine-derived speed to substantially said predetermined speed when the turbine speed is above said given value.

References Cited by the Examiner

UNITED STATES PATENTS 2,376,421   5/45   Drake _____ 322—52

FOREIGN PATENTS 1,086,334   8/60   Germany.

LLOYD McCOLLUM, *Primary Examiner.*